(12) United States Patent
Bäckström et al.

(10) Patent No.: US 8,228,867 B2
(45) Date of Patent: Jul. 24, 2012

(54) HANDOVER IN A WIRELESS NETWORK BACK TO A RESTRICTED LOCAL ACCESS POINT FROM AN UNRESTRICTED GLOBAL ACCESS POINT

(75) Inventors: Martin Bäckström, Danderyd (SE); Anders Larsson, Stockholm (SE); Thomas Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1007 days.

(21) Appl. No.: 12/280,279

(22) PCT Filed: May 30, 2006

(86) PCT No.: PCT/SE2006/050166
§ 371 (c)(1),
(2), (4) Date: Aug. 21, 2008

(87) PCT Pub. No.: WO2007/097672
PCT Pub. Date: Aug. 30, 2007

(65) Prior Publication Data
US 2010/0260139 A1  Oct. 14, 2010

Related U.S. Application Data

(60) Provisional application No. 60/774,667, filed on Feb. 21, 2006.

(51) Int. Cl.
*H04Q 7/00* (2006.01)
(52) U.S. Cl. ...................................................... 370/331
(58) Field of Classification Search .................. None
See application file for complete search history.

(56) References Cited

U.S. PATENT DOCUMENTS

| 5,734,707 | A | * | 3/1998 | El-Wailly | 379/167.06 |
|---|---|---|---|---|---|
| 5,794,149 | A |   | 8/1998 | Hoo |  |
| 5,794,157 | A | * | 8/1998 | Haartsen | 455/522 |
| 6,587,680 | B1 | * | 7/2003 | Ala-Laurila et al. | 455/411 |
| 6,728,540 | B1 |  | 4/2004 | Desantis et al. |  |
| 6,801,772 | B1 | * | 10/2004 | Townend et al. | 455/436 |
| 7,046,996 | B1 | * | 5/2006 | Andersen | 455/418 |
| 7,372,890 | B2 | * | 5/2008 | Batra et al. | 375/130 |
| 7,657,262 | B2 | * | 2/2010 | Grayson | 455/444 |
| 2002/0111166 | A1 | * | 8/2002 | Monroe | 455/435 |
| 2003/0186694 | A1 | * | 10/2003 | Sayers et al. | 455/426.1 |

(Continued)

FOREIGN PATENT DOCUMENTS
WO  WO0035230 A1  6/2000

(Continued)

*Primary Examiner* — Marcus R Smith
*Assistant Examiner* — Prenell Jones (57) ABSTRACT

The invention concerns methods, a device and computer program products for simplifying handover back to a restricted local access point from an unrestricted global access point as well as to a device implementing a restricted local access point for provision in a wireless network and a wireless network. In the network a restricted local access point hands over a mobile station to an unrestricted global access point and provides data enabling the restricted local access point to be identified as a candidate access point. A device for simplifying handover back determines that the restricted local access point is a candidate for further handover based on this data and informs the mobile station about the restricted local access point via the unrestricted glob access point. Thereby hand over may be considered also to the restricted local access point in addition to other surrounding access points.

27 Claims, 6 Drawing Sheets

U.S. PATENT DOCUMENTS

| | | | |
|---|---|---|---|
| 2004/0127163 A1* | 7/2004 | Schramm et al. | 455/67.11 |
| 2006/0019664 A1* | 1/2006 | Nelakanti et al. | 455/436 |
| 2006/0094371 A1* | 5/2006 | Nguyen | 455/67.13 |
| 2007/0002723 A1* | 1/2007 | Vare et al. | 370/203 |

FOREIGN PATENT DOCUMENTS

| | | |
|---|---|---|
| WO | WO 2005/079083 A1 | 8/2005 |
| WO | WO 2006/012909 A1 | 2/2006 |

* cited by examiner

| AMNL | IMNL |
|---|---|
| CGI1, BSIC1, $f_1$ | CGI1, BSIC1, $f_1$ |
| CGI1, BSIC2, $f_2$ | CGI2, BSIC2, $f_2$ |
| CGI3, BSIC3, $f_3$ | CGI3, BSIC3, $f_3$ |
| | CGI5, BSIC5, $f_5$ |
| | CGI6, BSIC6, $f_6$ |

HANDOVER IN A WIRELESS NETWORK BACK TO A RESTRICTED LOCAL ACCESS POINT FROM AN UNRESTRICTED GLOBAL ACCESS POINT

This application claims the benefit of U.S. Provisional Application No. 60/774,667, filed Feb. 21, 2006 the disclosure of which is fully incorporated herein by reference.

TECHNICAL FIELD OF THE INVENTION

The present invention relates to the field of telecommunication. The invention more particularly relates to methods, a device and computer program products for simplifying, in a wireless network, handover back to a restricted local access point from an unrestricted global access point, as well as to a device implementing a restricted local access point for provision in a wireless network and a wireless network.

DESCRIPTION OF RELATED ART

There has for some time been of interest to allow the use of one and the same mobile station at home and in a public wireless network.

For this reason there has been provided stations that have a dual mode operation, one cellular mode and one cordless mode. The mobile station then switches between modes as it moves between a public cellular network and a cordless base station. This is advantageous if a mobile station is to be provided in two different networks.

However these stations require exchange of the existing legacy cellular phone owned by the end user and are furthermore costly because of the dual mode operation.

It would therefore be of interest to allow a mobile station to be used both at home and in a cellular network and without the user having to acquire a special dual mode mobile station, i.e. through the user using an ordinary mobile station adapted for use in the public cellular network and to use it in his home with a home base station. This also opens the market of public wireless network operators to the home telephony segment. This also means that special restricted local access points have to be provided in the wireless network for enabling this functionality.

The ordinary unrestricted global access points of a network normally keep track of other access points in the network. They also provide this information to mobile stations, in order for these mobile stations to determine which access point is the best to communicate with. When mobile stations in the network have started communicating with one access point, there might be a need to hand over the connection to another access point. In order to do this the mobile station continuously monitors which access point is the best. However, the number of access points a mobile station monitors in this way has to be limited in order not to slow down the hand over process, which might need to be fast. As a consequence an ordinary unrestricted global access point does only provide the mobile station with information of a limited number of access points and then only a few number of unrestricted global access points. A restricted local access point is not included because there may be several such restricted local access points in the neighbourhood and therefore handover would be slowed down if these were to be considered. It is furthermore possible that it is impossible to provide enough unique identifiers for all restricted local access points. This means that it is not possible to provide all of them as handover candidates at the same time. Since the restricted local access points are no handover candidates, this also means that a connection being set up via a restricted local access point can be handed over to a global unrestricted access point, but then it is not possible to hand it back, even though the mobile station might be back within coverage of the restricted local access point. Since a restricted local access point may be covering a small area, such hand over may be needed fairly frequently as a mobile station moves in and out of the coverage area.

The present invention is therefore directed towards allowing hand over back to a restricted local access point from an unrestricted global access point.

SUMMARY OF THE INVENTION

One object of the present invention is thus to provide a method that simplifies hand over of a mobile station back to a restricted local access point from an unrestricted global access point.

This object is according to a first aspect of the present invention achieved through a method of simplifying, in a wireless network, handover back to a restricted local access point from an unrestricted global access point, comprising the steps of:
receiving, in an unrestricted global access point, a hand over of a mobile station from a restricted local access point,
determining that the restricted local access point is a candidate access point to perform further handover to based on data provided by the restricted local access point, and
informing the mobile station about the restricted local access point via the unrestricted global access point, in order to enable considering hand over of the mobile station to be performed also to the restricted local access point in addition to other surrounding access points.

Another object of the present invention is to provide a device that simplifies hand over of a mobile station back to a restricted local access point from an unrestricted global access point.

This object is according to a second aspect of the present invention achieved through a device for simplifying handover back to a restricted local access point from an unrestricted global access point and being arranged to:
determine that, for a mobile station being handed over from a restricted local access point to an unrestricted global access point, the restricted local access point is a candidate access point to perform further handover to based on data provided by the restricted local access point, and
inform the mobile station about the restricted local access point via the unrestricted global access point, in order to enable considering hand over of the mobile station to be performed also to the restricted local access point in addition to other surrounding access points.

Another object of the present invention is to provide another method that simplifies hand over of a mobile station back to a restricted local access point from an unrestricted global access point.

This object is according to a third aspect of the present invention also achieved by a method of simplifying, in a wireless network, handover back to a restricted local access point from an unrestricted global access point, comprising the steps of:
handing over a mobile station from a restricted local access point to an unrestricted global access point, and
providing, from the restricted local access point, data enabling identifying the restricted local access point as a candidate access point to perform further handover to, in order to allow considering performing hand over of the mobile station also to the restricted local access point in addition to other surrounding access points.

A further object of the present invention is to provide a device implementing a restricted local access point for provision in a wireless network that simplifies hand over of a mobile station back to the restricted local access point from an unrestricted global access point.

This object is according to a fourth aspect of the present invention achieved through a device implementing a restricted local access point for provision in a wireless network and being arranged to:

hand over a mobile station to an unrestricted global access point, and provide data enabling identifying the restricted local access point as a candidate access point to perform further handover to, in order to allow considering performing hand over of the mobile station also to the restricted local access point in addition to other surrounding access points.

Still another object of the present invention is directed towards providing a wireless network that simplifies hand over of a mobile station back to a restricted local access point from an unrestricted global access point.

This object is according to a fifth aspect of the present invention achieved through a wireless network comprising:
an unrestricted global access point,
a device implementing a restricted local access point being arranged to hand over a mobile station to the unrestricted global access point, and provide data enabling identifying the restricted local access point as a candidate access point to perform further handover to, and
a device for simplifying handover back to the restricted local access point from the unrestricted global access point and being arranged to:
  determine that, for the mobile station being handed over from the restricted local access point to the unrestricted global access point, the restricted local access point is a candidate access point to perform further handover to based on data provided by the restricted local access point, and
  inform the mobile station about the restricted local access point via the unrestricted global access point, in order to enable considering hand over of the mobile station to be performed also to the restricted local access point in addition to other surrounding access points.

Yet another object of the present invention is to provide a computer program product that simplifies hand over of a mobile station back to the restricted local access point from an unrestricted global access point.

This object is according to a sixth aspect of the present invention achieved through a computer program product for simplifying, in a wireless network, handover back to a restricted local access point from an unrestricted global access point, comprising computer program code to make a device for simplifying handover back to the restricted local access point perform, when the code is loaded into said device:

determine that, for a mobile station being handed over from a restricted local access point to an unrestricted global access point, the restricted local access point is a candidate access point to perform further handover to based on data provided by the restricted local access point, and inform the mobile station about the restricted local access point via the unrestricted global access point, in order to enable considering hand over of the mobile station to be performed also to the restricted local access point in addition to other surrounding access points.

Still another object of the present invention is to provide a further computer program product that simplifies hand over of a mobile station back to the restricted local access point from an unrestricted global access point.

This object is according to a seventh aspect of the present invention achieved through a computer program product for simplifying, in a wireless network, handover back to a restricted local access point from an unrestricted global access point, comprising computer program code to make a device implementing such a restricted local access point perform, when the code is loaded into said device:

order hand over of a mobile station to an unrestricted global access point, and provide data enabling identifying the restricted local access point as a candidate access point to perform further handover to, in order to allow considering performing hand over of the mobile station also to the restricted local access point in addition to other surrounding access points.

An unrestricted global access point is here defined as an access point which when provided in a network allows all mobile stations in the network to essentially communicate on equal terms, while a restricted local access point is here defined as an access point that has a separate set of rules relating to a limited set of mobile stations within the network and is mainly intended to allow these stations to communicate with a specific restricted local access point. Alternatively a restricted local access point can be restricted only in the sense of having lower output power, thus creating a range of coverage restricted to its close vicinity.

The present invention has many advantages. It allows hand over back to a restricted local access point. Since a restricted local access point may be covering a small area, such hand over may be needed fairly frequently as a mobile station moves in and out of the coverage area. The invention furthermore allows this to be done without having to define a broadcasting channel of the restricted local access point in a hand over list of the unrestricted global access point. This would normally require considerable effort on a network operator, especially if the network would include several such restricted local access points. Hand over of a regular call in the network is furthermore not influenced. Thus full hand over performance is maintained in the network for all regular calls, i.e. there is no service degradation.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
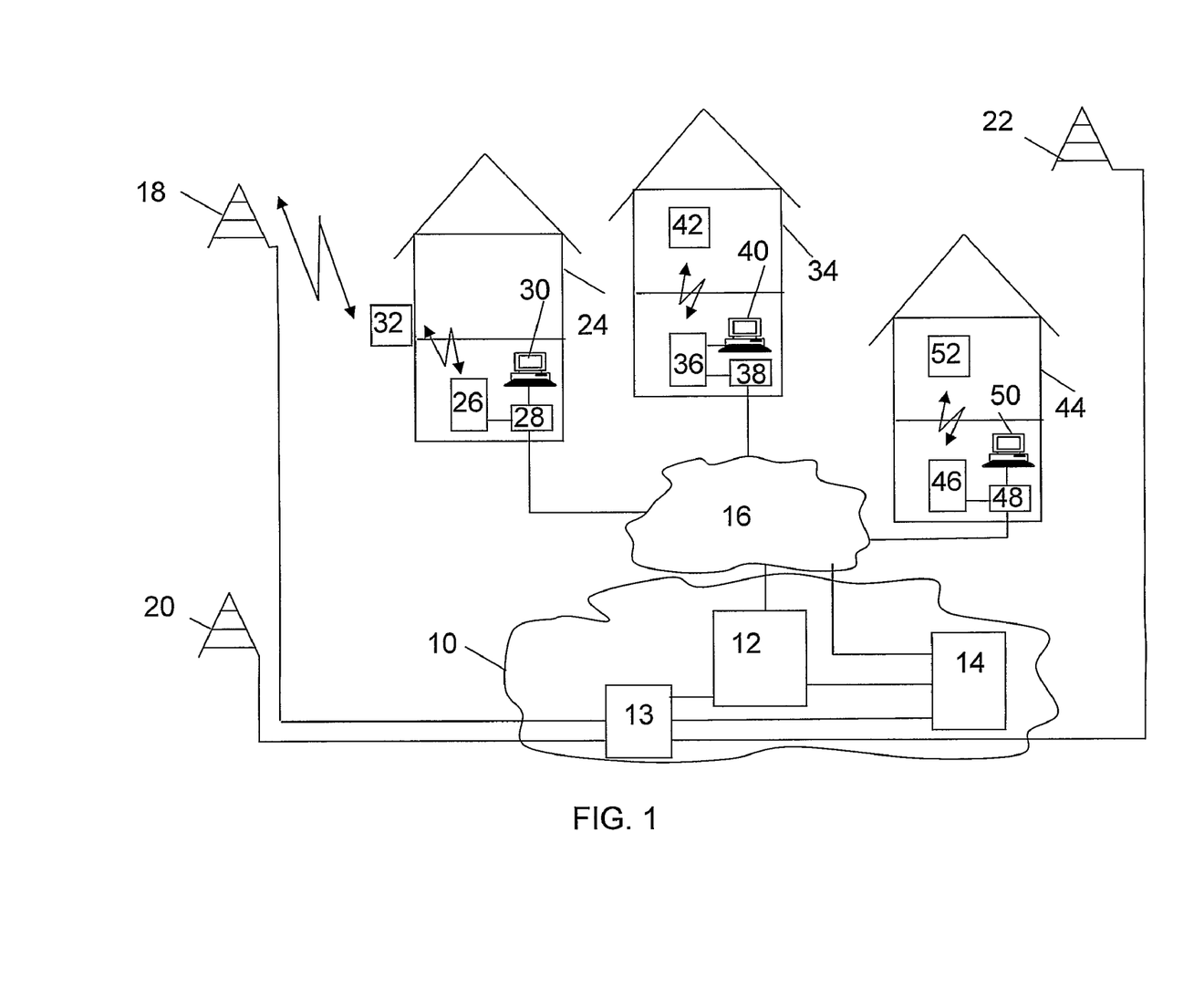
FIG. 1 schematically shows a wireless network comprising three ordinary access points and three restricted local access points, where each restricted local access point is being provided in a house, as well as a number of related entities of the network.

The present invention is described in the non-limiting, context of a wireless network in the form of a Public Land Mobile Network that is here a GSM (Global System for Mobile communications) network 10 shown in FIG. 1. Here it should be realised that the network is in no way limited to GSM, but can be any type of public land mobile network, like GPRS (General Packet Radio Service), UMTS (Universal Mobile Telecommunications System). It can also be based on for instance WLAN (Wireless Local Area Network) technology. The network 10 here includes at least one first traffic control unit 12, which in the case of GSM is an MSC (Mobile Services Switching Centre). If the network was a GPRS network this unit would be a SGSN (Serving GPRS Support Node) instead. The first traffic control unit 12 is furthermore connected to a first, second and third unrestricted global access point 18, 20 and 22 in the form of base stations via a second traffic control unit 13 in the form of a BSC (Base Station Controller). It is possible to combine GPRS and GSM networks. In this case the second traffic control unit 13 would be connected to both an MSC and a SGSN. The base stations 18, 20, 22 are ordinary base stations, which any mobile station being allowed to communicate in the network 10 can use for communication. The network 10 also includes an Operation and Maintenance service centre 14, where customer service is handled. This service centre 14 is also connected to both the traffic control units 12 and 13. It may also be connected to unrestricted global access points (not shown). The service centre 14 and the first traffic control unit 12 are furthermore both connected to an external communication network 16, which is here the Internet. It should be realised that the first traffic control unit 12 may be connected to several second traffic control units 13, and that there may be several more first traffic control units 12 in the wireless network 10 in order to control communication with mobile stations via one or more access points. It should also be realised that the network need not be provided with a central traffic control unit at all. What has been described so far is well known within the art.

In FIG. 1 there are also shown three different buildings 24, 34 and 44, where a first building 24 includes a first restricted local access point 26 connected to a modem 28. The modem 28 is connected to the external network 16 as well as to a computer 30 also provided in the first building. There is also provided a first user mobile station 32 communicating with the first restricted local access point 26. The first user mobile station 32 is here associated with the first restricted local access point 26. The first user mobile station 32 is also shown as communication with the first unrestricted global access point 18. The relevance of this will be explained shortly. The second building 34 includes a second restricted local access point 36 connected to a modem 38, which in turn is connected to the external network 16. Here a computer 40 is connected to the second restricted local access point 36 for connection to the modem 38. The reason for this is that this modem is of a type which only allows one other device to be connected to it. In this second building 34 there is a second user mobile station 42 that is associated with the second restricted local access point 36. Finally the third building 44 includes a third restricted local access point 46 connected to a modem 48. The modem 48 is connected to the external network 16, as well as to a computer 50 also provided in the third building 44. There is finally provided a third user mobile station 52 communicating with the third restricted local access point 46, where this third user mobile station 52 is a mobile station associated with the third restricted local access point 46.

It should here be realised that the restricted local access points 26, 36 and 46 for the first, second and third user mobile stations 32, 42, 52 act as access points within the network and are controlled by the first traffic control unit 12. The external network 16 is in this case just a channel that is used for providing this communication between the network 10 and the restricted local access points. The external network may also provide other types of communication with for instance the service centre 14. The reason for using the Internet is that many households have easy access to it. For this reason it is also evident that the external network can be any network that is provided for a household and can for instance be a cable TV network instead. In case the household has direct access to a LAN network, a modem might also not be needed. There are thus several ways in which this channel may be provided.

A restricted local access point restricts the use of the access point in question to mobile stations that are registered for being allowed to use it. It is also restricted in the sense that it has a low output power and thus covers a limited or restricted area.

The purpose of providing a restricted local access point in this way, is to let the operator of the network 10 simulate a home base station within his own network, where an end user can use his ordinary cellular phone also via this restricted access point. At the same time the user is automatically allowed to use the mobile station in the rest of the public wireless network 10 whenever there is no or insufficient contact with the restricted local access point. In this way it is for instance possible to delete a fixed land line network connection for an end user. The operator may then also provide different billing strategies for calls made via a restricted local access point and via other access points in the network. For the user of the mobile station, the mobile station is thus to resemble a cordless phone when inside the building and an ordinary mobile station when being provided outside the building. There is furthermore no need for the end user to keep track of several different phone numbers. However the restricted local access point is controlled by the operator of the network. In order to provide economy, it is furthermore often desirable that such a restricted local access point be provided at a low cost. This also means that it normally is much smaller, weaker in transmission power and provided with fewer traffic channels as compared with an ordinary access point, which furthermore may cover the restricted local access point as an umbrella. Thus an ordinary unrestricted global access point may be much stronger than the restricted local access point in the area the restricted local access point is intended to cover.

Figure 2:
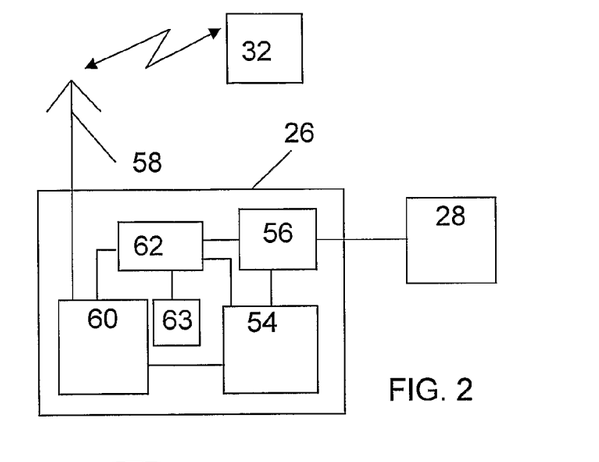
FIG. 2 shows a block schematic of different units of a restricted local access point, FIG. 3 schematically outlines broadcasting channels of the access points in the network as well as network identities provided when broadcasting.

FIG. 2 shows a block schematic of some relevant units of a device implementing the first restricted local access point 26 and the different other devices it communicates with in the first building. It should be realised that the other restricted local access points may be provided in the same way. This device 26 comprises an antenna 58 communicating with the first user mobile station 32, which antenna is connected to a radio circuit 60 that may be provided in the form of an ordinary mobile station chipset. The radio circuit 60 is connected to a control unit 62 and to a signal conversion unit 54 converting circuit switched voice to packet based voice. The signal conversion unit may use UMA/GAN (Unlicensed Mobile Access/Generic Access Network), which is a standard for making GSM calls over 802.11 or Bluetooth, where GSM protocols are tunneled over unlicensed bands. Both the control unit 62 and the signal conversion unit 54 are connected to an interface 56 that in turn is connected to the modem 28. The control unit 62 is furthermore connected to an access point identity store 63. By removing the signal conversion unit 54 and providing the interface 56 as an interface to a network control unit, the functionality of a device implementing an unrestricted global access point may be realised. However then the radio communication unit is much more powerful, the antenna very large and the number of traffic channels also fairly high.

Figure 3:
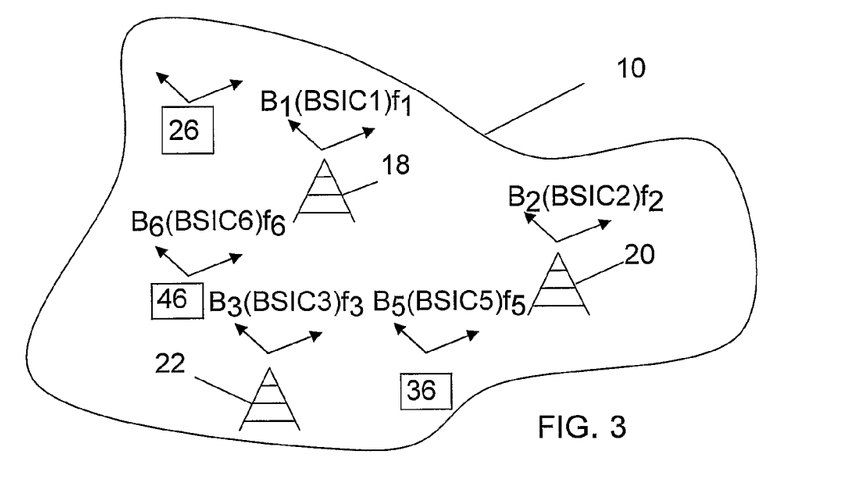
Figure 4:
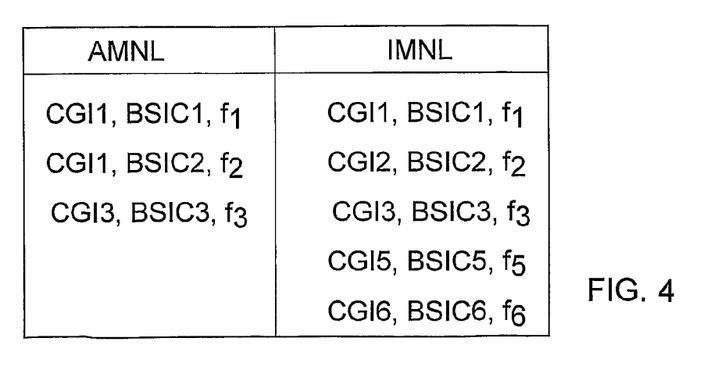
FIG. 4 shows an active mode neigbouring list and an idle mode neighbouring list provided for an access point in order be used in relation to a mobile station.
Figure 5:
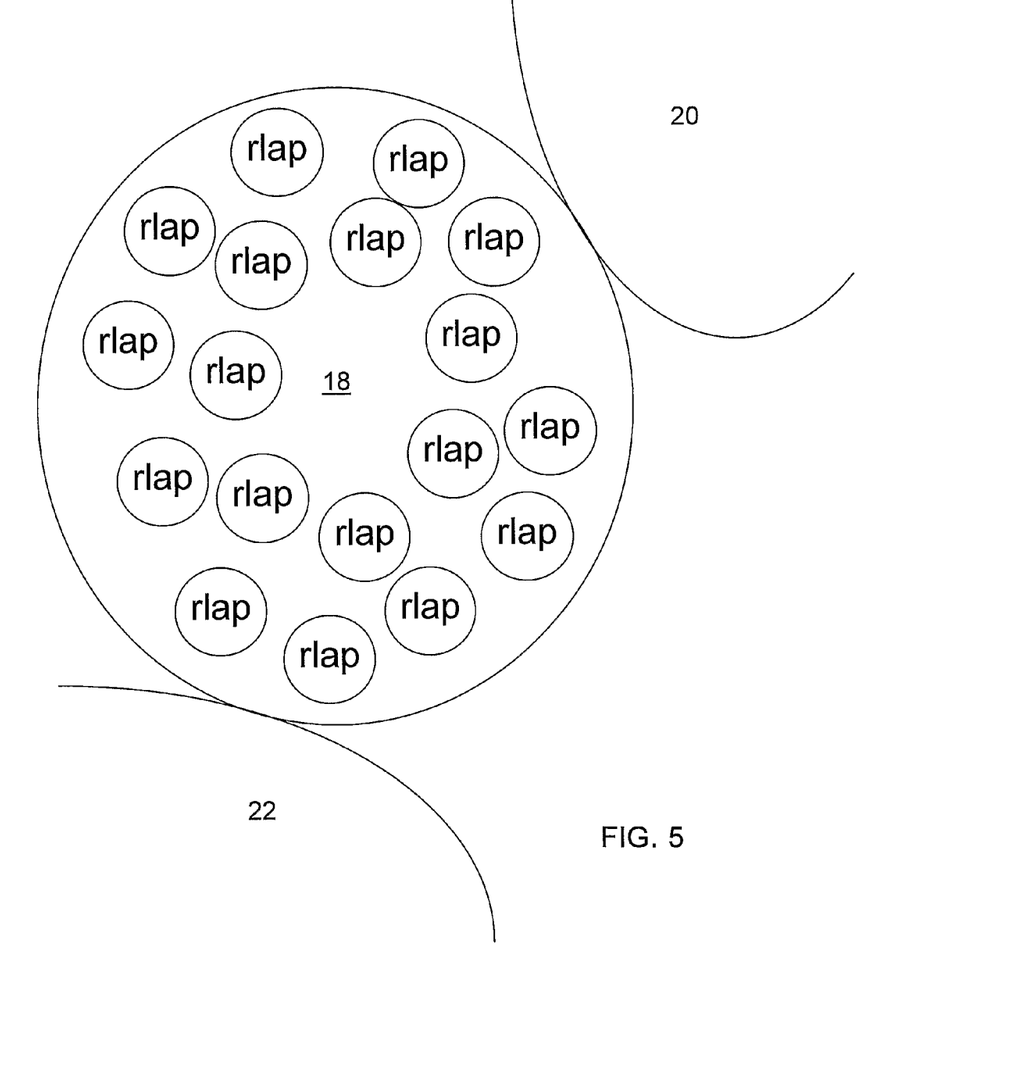
FIG. 5 shows an unrestricted global access point covering an area including several restricted local access points.
Figure 6A:
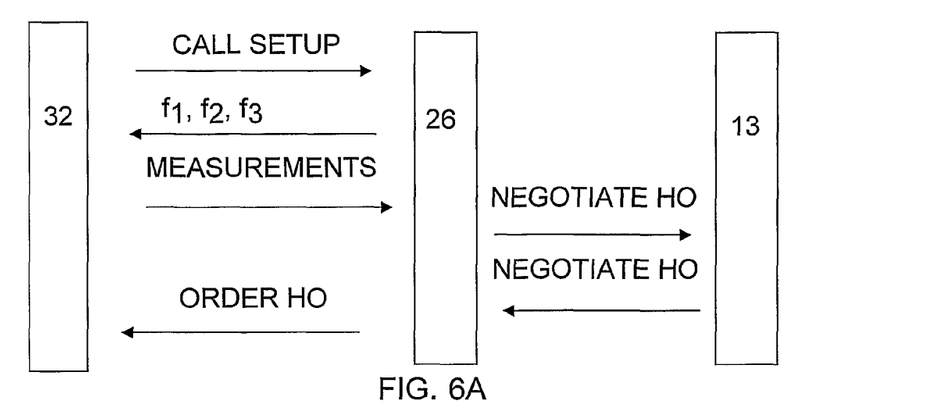
FIG. 6A shows different signals exchanged between a mobile station and a restricted local access point as well as between the restricted local access point and a second traffic control unit as the mobile station is handed over from the first restricted local access point to the first unrestricted global access point.
Figure 6B:
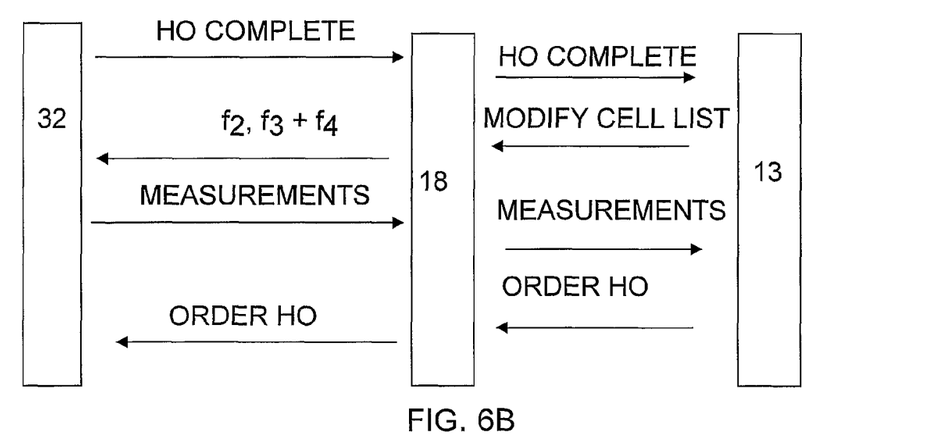
FIG. 6B shows different signals exchanged between the mobile station and the first unrestricted global access point as well as between the first unrestricted global access point and the second traffic control unit as the mobile station is to be handed over from the first unrestricted global access point to the second unrestricted global access point.
Figure 6C:
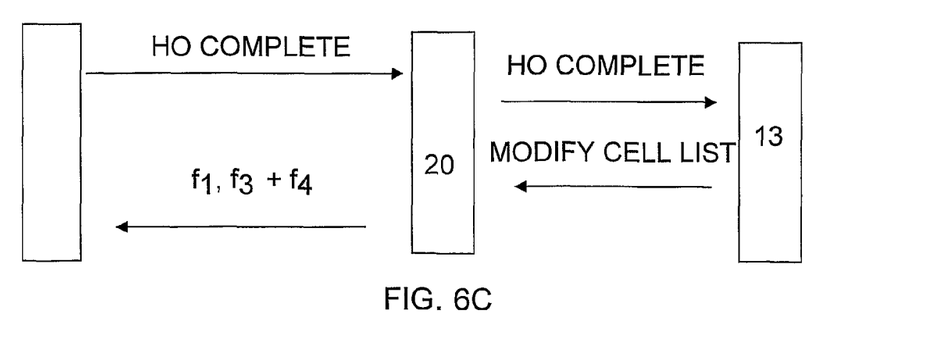
FIG. 6C shows different signals exchanged between the mobile station and the second unrestricted global access point as well as between the second unrestricted global access point and the second traffic control unit as the mobile station has been handed over to the second unrestricted global access point.
Figure 7:
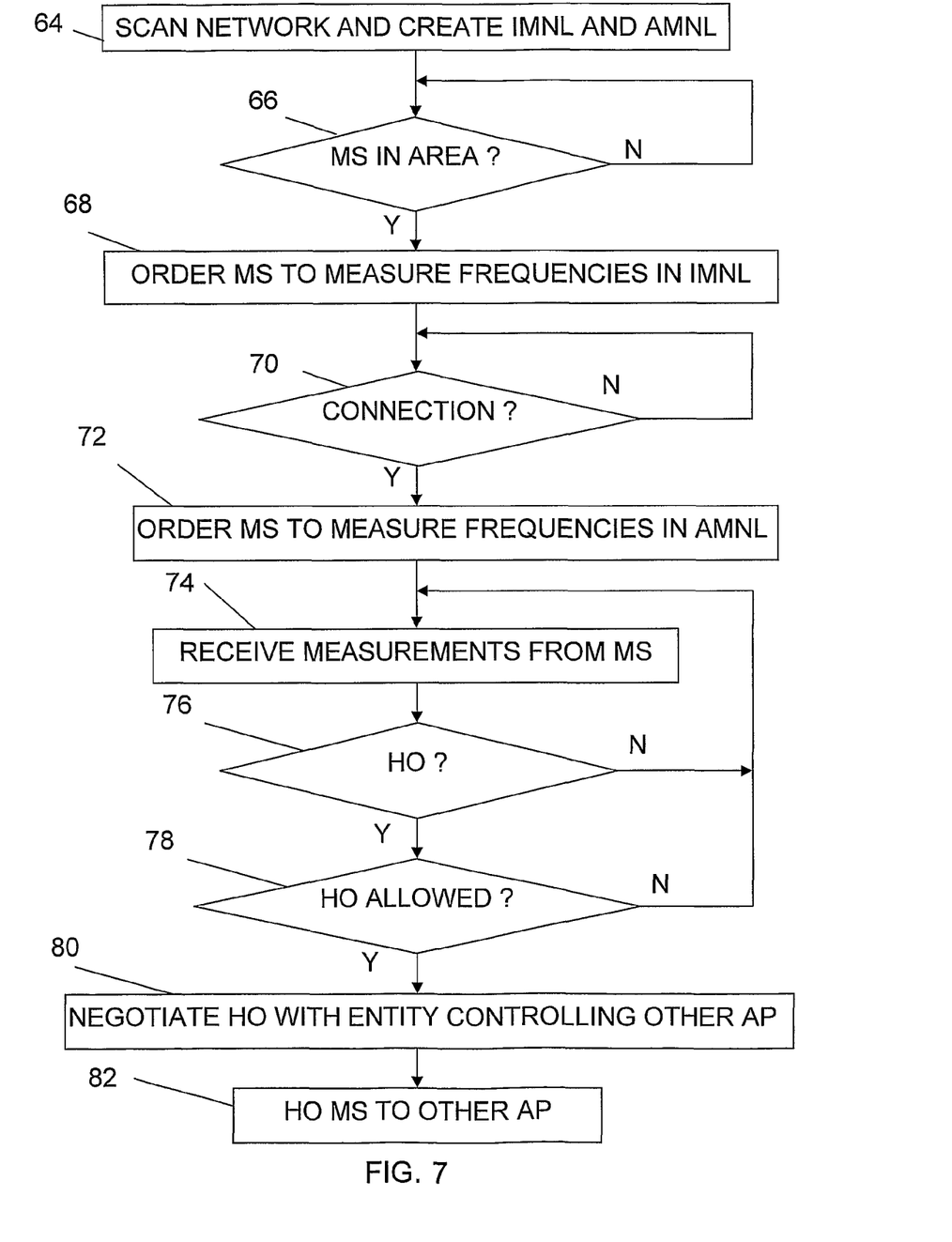
FIG. 7 shows a flow chart of a number of method steps performed in a restricted local access point according to the present invention.
Figure 8:
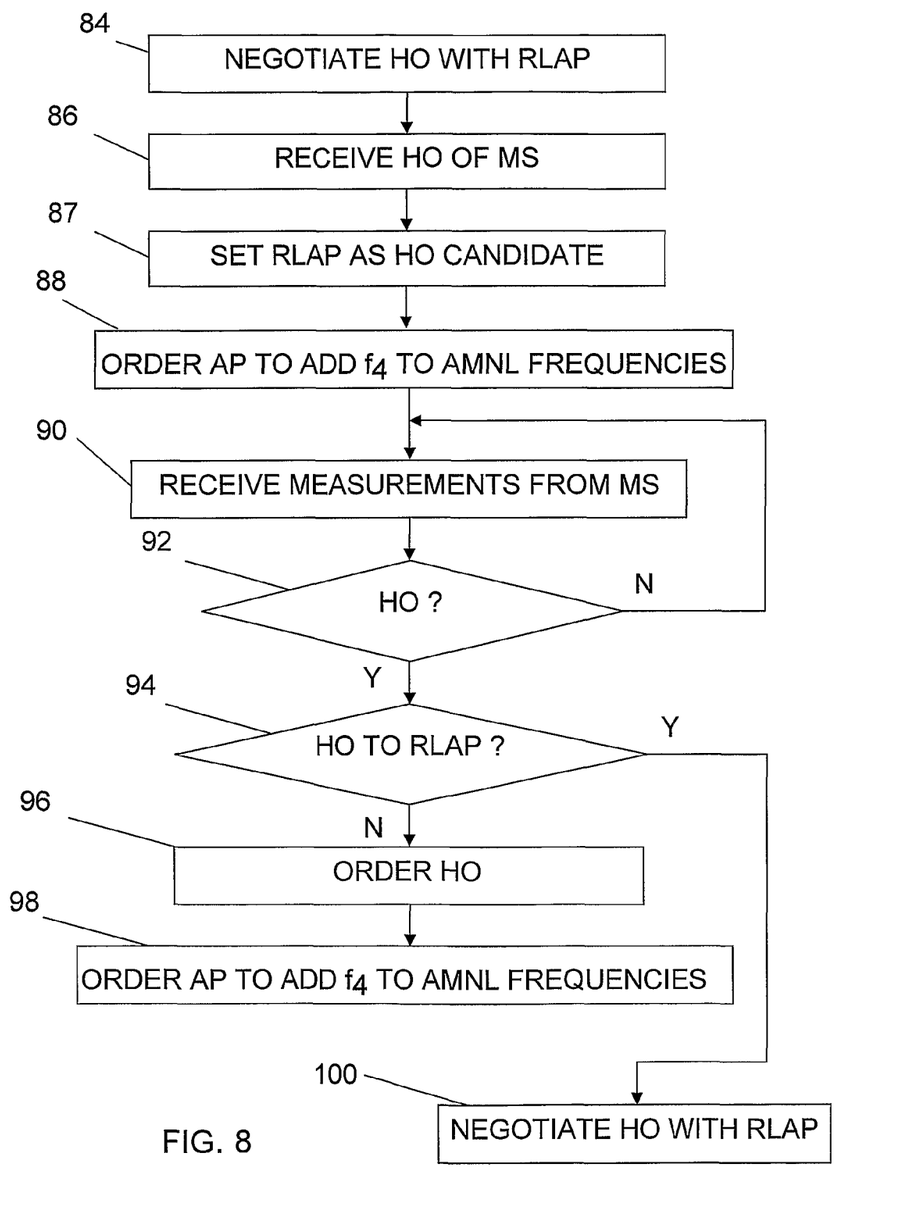
FIG. 8 shows a flow chart of a number of method steps performed in a second traffic control unit according to the present invention.

Now the principles of the present invention will be described with reference being made to the previously described FIGS. 1 and 2 together with FIG. 3-8. FIG. 3 schematically outlines broadcasting channels of the different access points in the network as well as network identities provided when broadcasting, while FIG. 4 shows a table showing an active mode neighbouring list AMNL and an idle mode neighbouring list IMNL and FIG. 5 shows an area covered by the first unrestricted global access point 18 that includes several restricted local access points and being provided next to areas covered by the second and third unrestricted global access points. FIG. 6A shows different signals exchanged between the first user mobile station and the first restricted local access point as well as between the first restricted local access point and the second traffic control unit 13 as the first user mobile station is handed over from the first restricted local access point to the first unrestricted global access point. FIG. 6B shows different signals exchanged between the mobile station and the first unrestricted global access point, and between the first unrestricted global access point and the second traffic control unit. FIG. 6C shows different signals exchanged between the mobile station and the second unrestricted global access point, and between the second unrestricted global access point and the second traffic control unit as the mobile station is handed over from the first unrestricted global access point to the second unrestricted global access point. Finally FIG. 7 shows a flow chart of a number of method steps performed in a restricted local access point and FIG. 8 shows a flow chart of a number of method steps performed in the second traffic control unit.

As a mobile station is roaming in the network, it is provided, via the access point that it is currently in contact with, with information about all neigbouring access points it might be of interest to use for communication. Assuming that a mobile station is in contact with the first unrestricted global access point 18, it can be seen from FIG. 5 that there may be a great number of restricted local access points rlap, while the number of global unrestricted access point are relatively few. When a mobile station is engaged in communication it may be handed over from one access point to another, where access point selection is made in the same way that access point is selected when roaming, based on signal strength. However if all access points in the neighbourhood would be handover candidates, for instance the second and third unrestricted global access points 20 and 22 together with all restricted local access points rlap covered by the first unrestricted global access point 18, the mobile station would have to perform signal strength measurements on all these candidates and also normally transmit all these measurements results to the first unrestricted global access point for a handover decision to be made. This is simply too much and as a result a call may be lost because handover could not be performed in time. The reason for this is that too many such measurements will slow down the hand over speed of the mobile station. This speed need in many instances be very high in order not to drop a call, for instance when travelling by car or by train. It is furthermore possible that it is impossible to provide enough unique identifiers for all restricted local access points. This means that it is not possible to simultaneously provide all of them as handover candidates. At the same time a mobile station being associated with a certain restricted local access point should be able to communicate with that access point shows different signals exchanged between the mobile station and the first unrestricted global access point, and between the first unrestricted global access point and the second traffic control unit, especially if there is a special billing agreement concerning that access point. However the main network cannot really easily keep track of this.

This means that a mobile station that starts communicating with a restricted local access point may be handed over to an unrestricted global access point, but cannot be handed over back to the restricted local access point. A mobile station may move back and forth between coverage of a restricted local access point and an unrestricted global access point, but still not be able to continue using the restricted local access point. A user may for instance start communicating with his mobile station via his restricted local access point and then move out into the garden after half a minute of communication with his mobile station, where the station is handed over to an unrestricted global access point, stay there for 15 seconds and then move back into the house and continue the conversation in the house in half an hour. As the user moves back into the house, where coverage of the restricted local access point is good, no handover back to the restricted local access point would be made. This means that the user would be using his mobile station in the main part of the network, when in reality he should have been using it via his restricted local access point. This is even more serious if the user had an advantageous billing agreement with the operator with regard to the use of his restricted local access point. The user would thus not be allowed to use the restricted local access point in the intended way. The present invention is directed towards solving this problem.

As a restricted local access point, here with the first restricted local access point 26 taken as an example, is first put to use, the control unit 62 orders the radio communication unit 60 to scan the network 10 in order to determine the broadcasting channels of the surrounding wireless access points in the network and more particularly when GSM is concerned, the frequencies of the broadcasting channels of these access points. The different access points and their BCCH broadcasting channels are schematically shown in FIG. 3. When doing this the first restricted local access point 26 may then detect both ordinary fixed unrestricted global and restricted local access points. Thus it may detect the first unrestricted global access point 18 that broadcasts information including an access point identity BSIC1 (Base Station Identity Code) on a first frequency $f_1$, the second unrestricted global access point 20 that broadcasts information including an access point identity BSIC2 on a second frequency $f_2$, the third unrestricted global access point 22 that broadcasts information including an access point identity BSIC3 on a third frequency $f_3$, the second restricted local access point 36 that broadcasts information including an access point identity BSIC5 also on a fifth frequency $f_5$ and the third restricted local access point 46 that broadcasts information including an access point identity BSIC6 also on a sixth frequency $f_6$. The first restricted local access point itself also broadcasts $B_4$ information including an access point identity BSIC4 on a fourth frequency $f_4$. It should here be realised that a lot of other information may be broadcast. The first unrestricted global access point does for instance also broadcast a cell global identity CGI for all neighbouring access points. Also these CGIs are detected. In this way it is possible to receive global identities of neigbouring access points.

When the network has been scanned, the results are provided from the radio communication unit 60 to the control unit 62, which stores or registers the detected identities together with the corresponding frequencies in the identity store 63. Thereafter the control unit 62 creates an idle mode neighbour list IMNL, regarding all the access points in its neighbourhood as well as an active mode neighbour list AMNL regarding only some access points. FIG. 4 shows these lists, where the IMNL includes the CGI, BSIC and frequency of all the access points in the network of FIG. 3, while the AMNL includes the same information but only for some access points, namely for the first, second and third unrestricted global access point 18, 20 and 22. Thus the first restricted local access point 28 scans the network and creates the idle mode neighbourhood list IMNL and the active mode neighbourhood list AMNL, step 64.

When this has been done, the first restricted local access point 26 can now determine if a registered user mobile station is in the area it covers, step 66. In the present example there is only one such user mobile station, namely the first user mobile station 32. It should be realised that in reality more than one may be registered for using the first restricted local access point 26. In case there is no registered mobile station in the covered area, step 66, the first restricted local access point 26 keeps on investigating. If there is, step 66, the control unit 62 fetches the idle mode neighbourhood list IMNL from store 54 and orders the radio communication unit 60 to send information about the frequencies of the access points in this list to the mobile station 32. By doing this the mobile station is ordered to measure on the frequencies in the IMNL, step 68. In this way the first restricted local access point 26 makes sure that the mobile station 32 may roam between different access points, which is typically done through the mobile station comparing different C/I (signal over interference) ratios of these frequencies and selecting the access point having the highest C/I ratio. Thereafter the first restricted local access point 26 investigates if a connection is being made in relation to the mobile station 32, for instance if a call is being set up to or from the mobile station 32, step 70. It is well known within the art how connections are being set up. In the case of GSM, call setup involves a fair amount of signalling between a mobile station and a base station controller, where the access point basically functions as a relay. How this may be performed will therefore not be described in detail here. If there is no connection being set up, the first restricted local access point 26 keeps investigating whether a connection is being set up, step 70.

If a connection is being set up, step 70, the control unit 62 fetches the active mode neighbourhood list AMNL from store 54 and orders the radio communication unit 60 to send information about the frequencies of the access points in this list to the mobile station 32. As these frequencies are broadcast the mobile station 32 is ordered to measure on the frequencies of the AMNL, step 72. Thereafter the mobile station 32 performs measurements on the frequencies of these access points in the active mode neighbourhood list AMNL, here on the frequencies $f_1$ and $f_2$ of the first and second unrestricted global access point 18 and 20, and sends these results to the first restricted local access point 26, step 74. The measurement results here make up data that enables a hand over decision to be made. Based on these measurement results a determination is then made if a hand over should be made or not. The decision is normally based on the C/I ratio (signal to interference ratio) of the different frequencies. This decision is here made in the first restricted local access point, while in the network such decisions are normally made in the second network control unit 13. It may also be made in the first network control unit, an unrestricted global access point or even in the mobile station. If no hand over is to be performed, step 76, the first restricted local access point 26 keeps on receiving measurement results, step 74, while if it is decided that a hand over should be made, the control unit 62 of the first restricted locals access point 26 may decide if the mobile station 32 is allowed to be handed over to the access point or not, step 78. If it is not allowed, the first restricted local access point 26 goes back and receives measurement results, step 74, while if hand over is allowed, step 78, hand over is negotiated with a network entity controlling the other access point, step 80. As an example shown in FIG. 1, the first user mobile station is to be handed over to the first unrestricted global access point 18, which it is here assumed is allowed, and thus this negotiating involves both the first restricted local access point and the first unrestricted global access point. This negotiation can take place directly between the access points, but normally this is handled by the second network control unit 13 and the first restricted local access point via the first network control unit 12. In these negotiations, the first restricted local access point 26 requests a handover to be made to the first unrestricted global access point 18 and in doing this transfers the destination CGI as well as its own CGI, broadcasting frequency and BSIC to the first traffic control unit 12, which in turn contacts the second traffic control unit 13 that controls the first unrestricted global access point 18. The second traffic control unit 13 in this way receives information that handover is wanted from the first restricted local access point 26 to the first unrestricted global access point 18, which includes data enabling the second traffic control unit 13 to determine that the first restricted local access point is a suitable future candidate access point. This data thus includes the CGI, broadcasting frequency and BSIC of the restricted local access point. If the first restricted local access point and the first unrestricted global access points were both handled by the second traffic control unit, CGI could here be omitted. Thereafter the first restricted local access point 26 hands over the mobile station 32 to the first unrestricted global access point 18, step 82, which may be done by ordering hand over through informing the mobile station of where in the signal structure of the first unrestricted global access point it is to be transmitting and receiving, which information is normally received via the first traffic control unit 12. The signals transmitted are generally outlined in FIG. 6A.

The second traffic control unit 13 controlling the first unrestricted global access point 18, thus negotiates the hand over with the first restricted local access point 26, step 84, and the first unrestricted global access point 18 receives the hand over of the first user mobile station 34, step 86. The second traffic control unit 13 also keeps an own idle mode neighbourhood list IMNL and an active mode neighbourhood list AMNL for the first unrestricted global access point 18. However, this list is normally provided beforehand, i.e. there is no scan of the network. This means that the first restricted local access point 26 is not on this list. Because of the possible restricted local access points that may exist, it is also not possible to have such access points in this list. Since a hand over has been made from the first restricted local access point, the second traffic control unit therefore determines that the first restricted local access point 26 should be a hand over candidate, step 87. This determination can be based on the BCCH (Broadcasting Control Channel) ARFCN (Absolute Radio Frequency Channel Number), i.e. broadcasting frequency, and BSIC (Base station Identity Code) of the first restricted local access point not being in the AMNL and having received a handover from this access point. When this determination has been made, the second traffic control unit 13 orders the first unrestricted global access point 18 to add the frequency $f_4$ of the first restricted local access point 26 to the frequencies of the AMNL list that it normally orders a mobile station to make measurements on, step 88. The addition is however a temporary addition that is valied only for this specific call. The first unrestricted global access point is preferably ordered through sending a special system information message that in GSM may be a message of the type SAACH (Slow Associated Control Channel) Info Modify. In this way the mobile station 32 is informed of the existence of the first restricted local access point. Therefore the mobile station 32 also considers the first restricted local access point in hand over situations. The second traffic control unit also has to keep track of the fact that the measurement results provided by the mobile station for this frequency $f_4$ and BSIC BSIC4 for the first restricted local access point 26 having identity CI4 are associated with this specific call.

Thereafter the mobile station 32 performs measurements on the different access points, including the first restricted local access point 26, and sends these results to the first unrestricted global access point 18, which forwards them to the second traffic control unit 13, step 90. The measurement results also here make up data that enables a hand over decision to be made. Based on these measurement results the second traffic control unit 13 then decides if a hand over should be made or not, step 92, in the same way as has been described above. If no hand over is to be performed, step 92, the first unrestricted global access point 18 keeps on receiving measurement results, step 90, while if it is decided that a hand over should be made, step 92, the second traffic control unit 13 investigates if hand over is to be made to the first restricted local access point 26, step 94. If not, it orders hand over to the other access point, step 96. The communication between the mobile station and second traffic control unit 13 via the first unrestricted global access point is schematically shown in FIG. 6B.

After the mobile station has been handed over to the other access point. The second traffic control unit 13 orders the other access point to add the frequency of the first restricted local access point 26 to the frequencies of access points in the AMNL list for the connection with this mobile station 32, step 98. The ordering of adding a frequency may be done by sending a similar special system information message that is mentioned above. These signals are schematically shown in FIG. 6C.

If the access point is the first restricted local access point 26, step 96, hand over is negotiated with the first restricted local access point 26, step 100, and handed over in a normal way.

When the other access point is controlled by another second traffic control unit of the network or is a restricted local access point, handover is negotiated via the first traffic control unit. Naturally all these steps are not run through if communication is ended before hand over is to be made.

The method described was above described in relation to the first restricted local access point. The other restricted local access points may function in the same way.

The second traffic control unit in this way functions as a device that simplifies handover back to the restricted local access point from the unrestricted global access point. The determination of if a restricted local access point is to be a candidate access point for hand over may however also be made in other parts of the network, for instance in the first network control unit or in each unrestricted global access point.

The method outlined above has the following advantages. It allows hand over back to a restricted local access point. Since a restricted local access point may be covering a small area, such hand over may be needed fairly frequently as a mobile station moves in and out of the coverage area. The invention furthermore allows this to be done without having to define the broadcasting channel of the restricted local access point in the AMNL provided for the unrestricted global access point. This would normally require considerable effort on the network operator, especially if the network would include several such restricted local access points. Hand over of a regular call in the network is furthermore not influenced. Thus full hand over performance is maintained in the network for all regular calls, i.e. there is no service degradation.

The determination of if a mobile station is allowed to be handed over to an access point from the first restricted local access point can include a number of different decisions. A first is that hand over should not be allowed to be made to another restricted local access point. In order to enable this a restricted local access point has to determine which surrounding access points that are restricted local access points and which are unrestricted global access points. It can do this by analysing the CGI (Cell Global Identity) of the other access points. A CGI consists of a number of different sections, MCC (Mobile Country Code)-MNC (Mobile Network Code)-LAC (Location Area Code)-CI (Cell Identity). CI can here for instance range between 1 and 65,535. According to a first variation of this aspect of the present invention, the CIs of the restricted local access points are provided in a part of this interval, which may be in the interval between 40,000 and 65,535. This means that once the first restricted local access point has identified the CGI of a certain frequency; it may directly determine that it is a restricted local access point by investigating the interval that the CI is provided in. Also the other parts of the CGI can be used in the same way. Identifying a restricted local access point may thus also be based on location area LAC or network identity, which is given by MCC plus MNC.

It is furthermore possible to use the BSIC which is broadcast by for instance the third restricted local access point in the SCH (Synchronisation Channel) broadcasting channel. The BSIC includes two different codes NCC (Network Colour Code), which is a code that is normally handed out by telecommunication authorities, and BCC (Base Station Colour Code). According to the present invention one or more values of one of these codes may be pre-set to indicate that an access point is a restricted local access point. Thus the first restricted local access point may find out that a neighbouring access point is a restricted local access point by looking at either the NCC or BCC. Yet another alternative is to use different broadcasting frequencies for unrestricted global access points and restricted local access points. In this case the frequency thus directly indicates that an access point is a restricted local access point. It is furthermore possible that all restricted local access points adds a restricted local access point indication field in a System information message sent on a broadcasting channel. Thus the first restricted local access point may also detect this broadcast information and make a setting that the frequency is used by another restricted local access point. As another alternative it is also possible that the first restricted local access point queries a network entity, such as the second traffic control unit in FIG. 1, about if a CGI or CI is associated with a restricted local access point, which traffic control unit responds with a yes or no.

It is furthermore possible that the main part of the network that includes unrestricted global access points is provided with a first network identity, while another part of the network that includes the restricted local access points is provided with a second different network identity. It is then possible that hand over is disallowed from the part of the network having the second network identity to the part having the first network identity. It is furthermore possible to disallow handover to all unrestricted global access points or to one or more selected unrestricted global access points.

In the restricted local access point, the control unit can be implemented through one or more processors together with memory units comprising computer program code for performing its function. It should furthermore be realised that the radio communication unit and control unit may be combined into one and the same unit. The program code mentioned above may also be provided as a computer program product, for instance in the form of a data carrier, such as a CD ROM disc or as program code downloadable from a server. The second traffic control unit may also be provided in the same manner and having essentially the same units.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. Method of simplifying, in a wireless network, a handover of a mobile station back to a restricted local access point from an unrestricted global access point, the method implemented by a traffic control unit comprising the steps of:
   negotiating, with a restricted local access point, a hand over of the mobile station from the restricted local access point to an unrestricted global access point,
   determining that the restricted local access point is a candidate access point to perform a further hand over based on data provided by the restricted local access point, and
   ordering the unrestricted global access point to add a neighbor frequency associated with the restricted local access point to an active mode neighbourhood list (AMNL) that includes data regarding one or more other surrounding access points and to inform the mobile station about the restricted local access point to enable the mobile station to consider the further hand over to be performed also to the restricted local access point in addition to the other surrounding access points.

2. Method according to claim 1, wherein the step of informing comprises informing about a temporary neighbour frequency that is associated with a broadcasting channel of this restricted local access point.

3. Method according to claim 1, further comprising the step of at least receiving data enabling a decision to be made to hand over the mobile station to another access point than the restricted local access point, handing over the mobile station to the other access point, and informing the mobile station about the restricted local access point via the other access point, in order to allow the mobile station to consider performing handover also to the restricted local access after being handed over to the other access point.

4. Method according to claim 1, further comprising the step of informing the mobile station about unrestricted global access points to be considered when determining handover.

5. Device for simplifying a handover of a mobile station back to a restricted local access point from an unrestricted global access point, the device comprising:
   a control unit implemented through one or more processors with non-transitory memory units comprising computer program code, the control unit being arranged to:
   negotiate, with a restricted local access point, a hand over of the mobile station from the restricted local access point to the unrestricted global access point,
   determine that, for the mobile station being handed over from the restricted local access point to the unrestricted global access point, the restricted local access point is a candidate access point to perform a further handover to based on data provided by the restricted local access point, and
   order the unrestricted global access point to add a neighbor frequency associated with the restricted local access point to an active mode neighbourhood list (AMNL) that includes data regarding one or more other surrounding access points and to inform the mobile station about the restricted local access point to enable the mobile station to consider the further hand over to be performed also to the restricted local access point in addition to the other surrounding access points.

6. Device according to claim 5, wherein the control unit being arranged to inform the mobile station about a temporary neighbour frequency that is associated with a broadcasting channel of this restricted local access point.

7. Device according to claim 5, wherein the control unit being further arranged to at least receive data enabling a decision to be made to hand over the mobile station to another access point than the restricted local access point, at least control hand over the mobile station to the other access point and inform the mobile station about the restricted local access point via the other access point, in order to allow the mobile station to consider performing handover also to the restricted local access after being handed over to the other access point.

8. Device according to claim 5, wherein the control unit is provided in a network control unit.

9. Device according to claim 5, wherein the control unit is provided in an unrestricted global access point.

10. Device according to claim 5, wherein the control unit being further arranged to inform the mobile station about unrestricted global access points to be considered when determining handover.

11. Method of simplifying, in a wireless network, a handover of a mobile station back to a restricted local access point from an unrestricted global access point, the method implemented by the restricted local access point comprising the steps of:
scanning the wireless network for determining surrounding wireless access points,
creating an active mode neighbourhood list (AMNL) including data regarding some of these surrounding access points and ordering the mobile station to investigate the quality of communication with the access points of the active mode neighbourhood (AMNL) list if engaged in communication,
handing over the mobile station from the restricted local access point to the unrestricted global access point, and providing, from the restricted local access point, data enabling identifying the restricted local access point as a candidate access point to perform further hand over to allow considering performing the further hand over of the mobile station also to the restricted local access point in addition to other surrounding access points.

12. Method according to claim 11, further comprising the steps of at least receiving data, from the mobile station, indicating that a hand over should be made to another access point, determining if the mobile station is allowed to be handed over to the other access point, and disallowing handover in case it is not.

13. Method according to claim 12, wherein the step of determining if the mobile station is allowed to be handed over comprises determining if the other access point is another restricted local access point and the step of disallowing handover comprises disallowing hand over in case it is.

14. Method according to any of claim 12, wherein the step of determining if the mobile station is allowed to be handed over comprises determining if the other access point is associated with another network identity than the restricted local access point and the step of disallowing handover comprises disallowing hand over in case it is.

15. Method according to any of claim 12, wherein the step of determining if the mobile station is allowed to be handed over comprises:
determining whether the other access point is an unrestricted global access point; and
wherein disallowing hand over comprises disallowing hand over when the other access point comprises an unrestricted global access point.

16. Method according to claim 15, wherein the step of determining if the mobile station is allowed to be handed over comprises determining if the other access point is a specific unrestricted global access point and the step of disallowing hand over comprises disallowing hand over in case it is.

17. Method according to claim 11, further comprising the steps of creating an idle mode neighbourhood list (IMNL) comprising data about more access points than in the active mode neighbourhood list, and ordering the mobile station to investigate the quality of communication with the access points of the list if not engaged in communication.

18. Device implementing a restricted local access point for provision in a wireless network, the device comprising a control unit implemented through one or more processors with non-transitory memory units comprising computer program code, the control unit being arranged to:
scan the wireless network for determining surrounding wireless access points,
create an active mode neighbourhood list (AMNL) including data regarding some of these surrounding access points and ordering the mobile station to investigate the quality of communication with the access points of the active mode neighbourhood (AMNL) list if engaged in communication, and
hand over the mobile station to the unrestricted global access point, and provide data enabling identifying the restricted local access point as a candidate access point to perform further hand over to allow considering performing the further hand over of the mobile station also to the restricted local access point in addition to the other surrounding access points.

19. Device according to claim 18, wherein the control unit being further arranged to at least receive data, from the mobile station, indicating that a hand over should be made to another access point, determine if the mobile station is allowed to be handed over to the other access point and disallowing handover in case it is not.

20. Device according to claim 19, wherein the control unit when being arranged to determine if the mobile station is allowed to be handed over is arranged to determine if the other access point is another restricted local access point and if yes then disallow the handover.

21. Device according to claim 18, wherein the control unit being further arranged to create an idle mode neighbourhood list (IMNL) comprising data about more access points than in the active mode neighbourhood list and to order the mobile station to investigate the quality of communication with the access points of the list if not engaged in communication.

22. Wireless network comprising: an unrestricted global access point. a device implementing a restricted local access point being arranged to hand over a mobile station to the unrestricted global access point, and provide data enabling identifying the restricted local access point as a candidate access point to perform a further hand over to, and a device for simplifying handover back to the restricted local access point from the unrestricted global access point and being arranged to:
negotiate, with the restricted local access point, the hand over of the mobile station from the restricted local access point to the unrestricted global access point,
determine that, for the mobile station being handed over from the restricted local access point to the unrestricted global access point, the restricted local access point is a candidate access point to perform a further hand over based on data provided by the restricted local access point, and
ordering the unrestricted global access point to add a neighbor frequency associated with the restricted local access point to an active mode neighbourhood list (AMNL) that includes data regarding one or more other surrounding access points and to inform the mobile station about the restricted local access point to enable the mobile station to consider the further hand over to be performed also to the restricted local access point in addition to the other surrounding access points.

23. A non-transitory computer readable medium that contains instructions for simplifying, in a wireless network, a handover of a mobile station back to a restricted local access point from an unrestricted global access point, comprising computer program code to make a device for simplifying handover back to the restricted local access point perform, when the code is loaded into said device:

negotiate, with the restricted local access point, the hand over of the mobile station from the restricted local access point to the unrestricted global access point, determine that, for the mobile station being handed over from the restricted local access point to the unrestricted global access point, the restricted local access point is a candidate access point to perform a further hand over based on data provided by the restricted local access point, and ordering the unrestricted global access point to add a neighbor frequency associated with the restricted local access point to an active mode neighbourhood list (AMNL) that includes data regarding one or more other surrounding access points and to inform the mobile station about the restricted local access point to enable the mobile station to consider the further hand over to be performed also to the restricted local access point in addition to the other surrounding access points.

24. A non-transitory computer readable medium that contains instructions for simplifying, in a wireless network, a handover of a mobile station back to a restricted local access point from an unrestricted global access point, comprising computer program code to make a device implementing such a restricted local access point perform, when the code is loaded into said device: scan the wireless network for determining surrounding wireless access points, create an active mode neighbourhood list (AMNL) including data regarding some of these surrounding access points and order the mobile station to investigate the quality of communication with the access points of the active mode neighbourhood (AMNL) list if engaged in communication, and order the hand over of the mobile station to the unrestricted global access point, and provide data enabling identifying the restricted local access point as a candidate access point to perform further hand over to allow considering performing the further hand over of the mobile station also to the restricted local access point in addition to the other surrounding access points.

25. Method according to claim 11, wherein after the order step further comprising the step of receiving from the mobile station results of the measured frequencies in the active mode neighborhood list (AMNL).

26. Device according to claim 18, wherein the control unit further being arranged to after the order operation to receive from the mobile station results of the measured frequencies in the active mode neighborhood list (AMNL).

27. The non-transitory computer readable medium according to claim 24, further contains instructions comprising computer program code to make the device implementing the restricted local access point to perform after the order operation to receive from the mobile station results of the measured frequencies in the active mode neighborhood list (AMNL).

* * * * *

UNITED STATES PATENT AND TRADEMARK OFFICE
CERTIFICATE OF CORRECTION

PATENT NO. : 8,228,867 B2  
APPLICATION NO. : 12/280279  
DATED : July 24, 2012  
INVENTOR(S) : Backstrom et al.

It is certified that error appears in the above-identified patent and that said Letters Patent is hereby corrected as shown below:

On the Title Page, in Item (57), under "ABSTRACT", in Column 2, Lines 5-6, delete "in a wireless network and a wireless network." and insert -- in a wireless network. --, therefor.

On the Title Page, in Item (57), under "ABSTRACT", in Column 2, Line 13, delete "glob" and insert -- global --, therefor.

In the Specifications:

In Column 1, Line 18, delete "in a wireless network and a wireless network." and insert -- in a wireless network. --, therefor.

In Column 4, Line 65, delete "neigbouring" and insert -- neighbouring --, therefor.

In Column 4, Lines 66-67, delete "in order be used" and insert -- in order to be used --, therefor.

In Column 6, Line 40, delete "network and" and insert -- network 10 and --, therefor.

In Column 7, Line 46, delete "FIG." and insert -- FIGS. --, therefor.

In Column 8, Line 9, delete "neigbouring" and insert -- neighbouring --, therefor.

In Column 9, Line 35, delete "neigbouring" and insert -- neighbouring --, therefor.

In Column 10, Line 20, delete "broadcast the" and insert -- broadcast, the --, therefor.

In Column 11, Line 40, delete "valied" and insert -- valid --, therefor.

In Column 11, Line 43, delete "SAACH" and insert -- SACCH --, therefor.

Signed and Sealed this  
Sixteenth Day of April, 2013

Teresa Stanek Rea  
*Acting Director of the United States Patent and Trademark Office*

CERTIFICATE OF CORRECTION (continued)
U.S. Pat. No. 8,228,867 B2

In the Claims:

In Column 15, Line 19, in Claim 11, delete "neighbourhood (AMNL) list" and insert -- neighbourhood list (AMNL) --, therefor.

In Column 15, Line 40, in Claim 14, delete "according to any of claim" and insert -- according to claim --, therefor.

In Column 15, Line 46, in Claim 15, delete "according to any of claim" and insert -- according to claim --, therefor.

In Column 16, Line 9, in Claim 18, delete "neighbourhood (AMNL) list" and insert -- neighbourhood list (AMNL) --, therefor.

In Column 16, Line 37, in Claim 22, delete "point." and insert -- point, --, therefor.

In Column 18, Line 4, in Claim 24, delete "neighbourhood (AMNL) list" and insert -- neighbourhood list (AMNL) --, therefor.